United States Patent Office 2,777,733
Patented Jan. 15, 1957

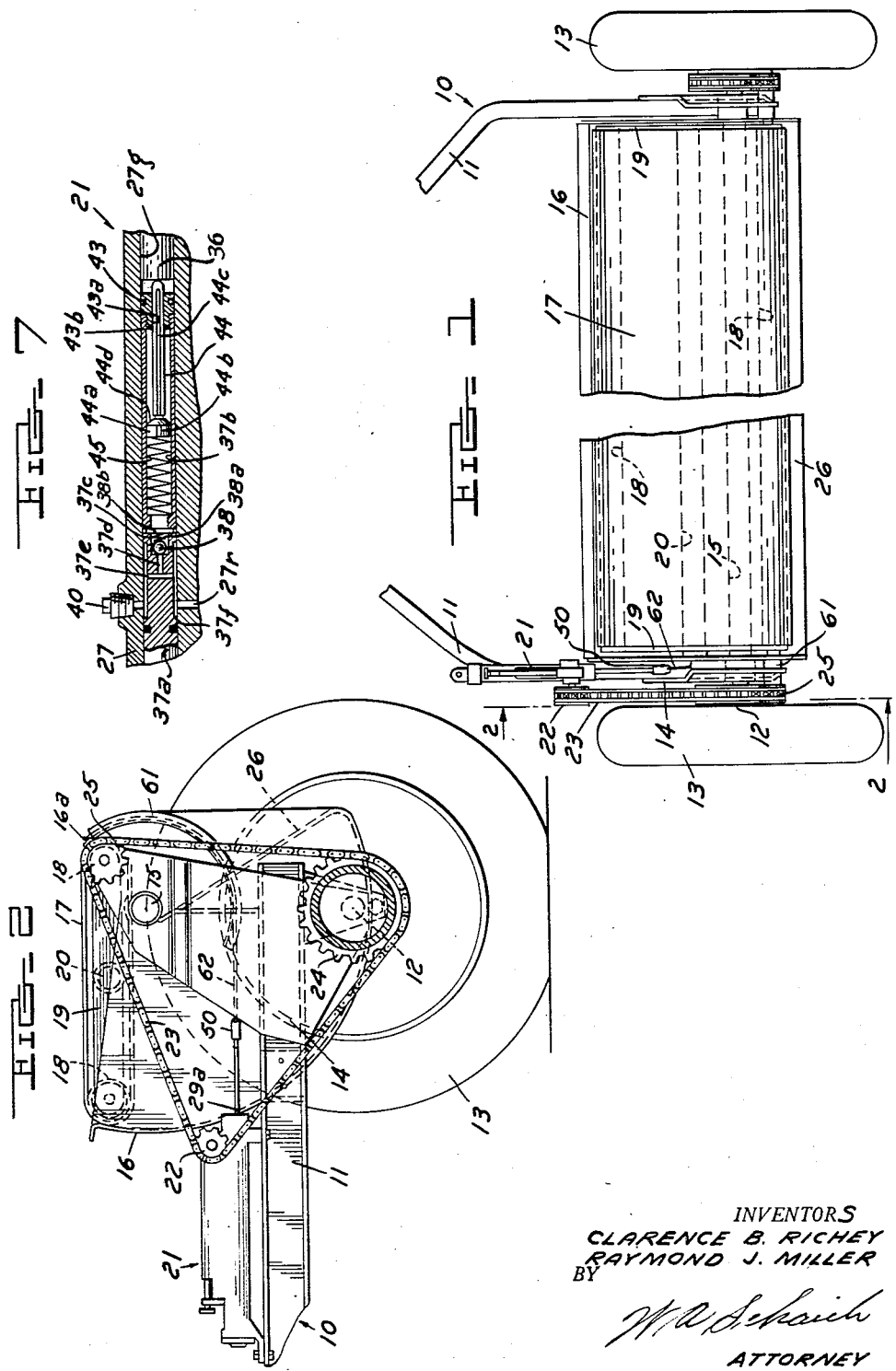

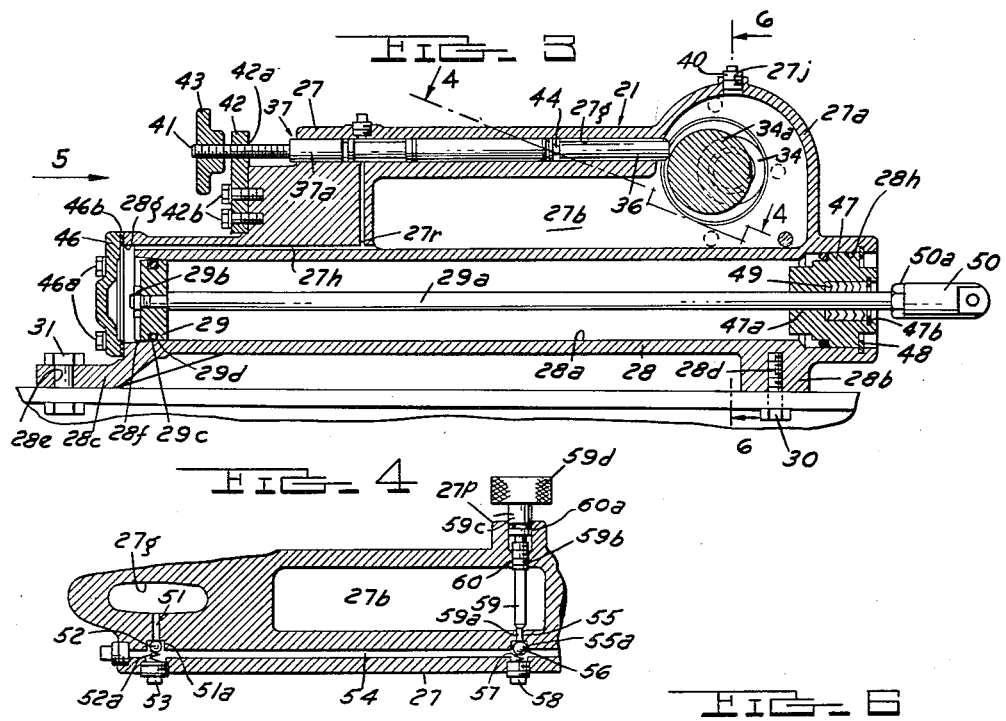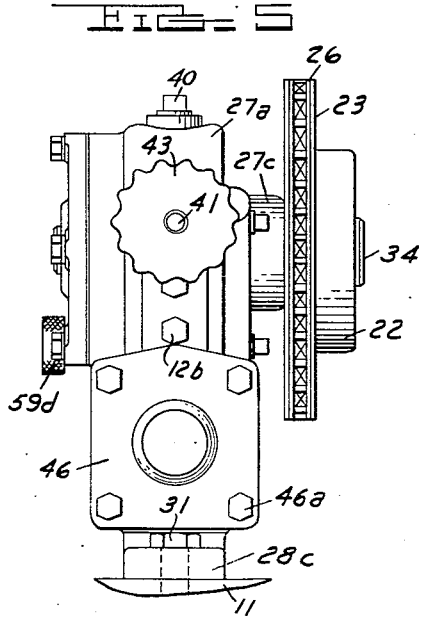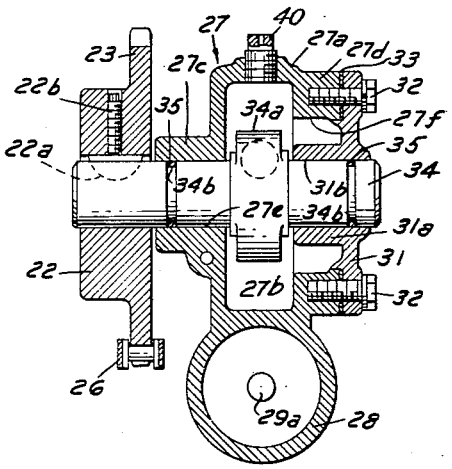

2,777,733

CONTROL DEVICE FOR MATERIAL DISTRIBUTING HOPPER

Raymond J. Miller, Detroit, and Clarence B. Richey, Royal Oak, Mich., assignors, by mesne assignments, to Ford Motor Company, Dearborn, Mich., a corporation of Delaware Application February 7, 1951, Serial No. 209,726

3 Claims. (Cl. 298—20)

This invention relates to an improved device for controlling the rate of movement of the piston of a hydraulic cylinder.

In preparing soil for crops of various sorts, there is usually deposited on the ground either before or after plowing, a measured amount of fertilizer, lime, or other soil renovating materials. Many types of spreading devices have been heretofore employed to distribute such material and most all of such devices utilize some sort of mechanical arrangement for measuring and dispensing the material being distributed on the ground. Most of these devices are ground driven by the spreading device. While perhaps a large number of these measuring devices are relatively accurate, the spreading devices heretofore known have all utilized various forms of apertures or nozzles to discharge the fertilizer which are prone to clog at the least provocation; hence regardless of the accuracy of the measuring device, the material dispensing machine is hampered in the proper distribution of the material by the clogging of such machines.

In order to eliminate such clogging of the distribution mechanism of the material distributor, other types of machines have been developed which utilize a substantially different concept in the distribution of the material. One such machine is described and claimed in the copending application of Clarence B. Richey filed February 8, 1951, Serial No. 209,933 and assigned to the assignee of this application. This machine incorporates a swinging or rotary hopper from the top of which the fertilizer is removed by an endless belt. The hopper is raised upwardly against the continuously moving belt by a suitable drive mechanism generally powered by the wheels of the material distributor. Unfortunately, however, the various mechanical feeding arrangements for incrementally rotating the hopper to insure that the belt will be in constant engagement with the material to be distributed were far from satisfactory.

It has been noted too that in distributing fertilizer or lime on a field, many distributors do not deliver a constant rate of application of such material over the ground traversed. This is especially noticeable when the speed of the distributor is accelerated or decelerated such as when going down a slope or up an incline. Unfortunately the feeding mechanism of such distributors were not capable of adjusting themselves to variations in the ground speed with sufficient accuracy to insure a uniform rate of delivery of the material on the ground. Another drawback was the inability to vary the rate of delivery of the material over a wide range.

Accordingly, it is an object of this invention to provide an improved control device including a hydraulically operated piston for controlling the movement of a pivoted hopper of a material distributing implement.

Another object of this invention is to provide a control device for a hydraulically operated piston which has an infinite number of adjustments to provide any desired increment of movement of the piston as a function of the speed of rotation of a control or reference member.

A further object of this invention is to provide a control device for a hydraulically operated piston which is positive and highly accurate in operation and yet which is relatively simple and inexpensive to manufacture.

Another object of this invention is to provide an hydraulic control device for a material distributor wherein the rate of delivery of the material to be distributed is maintained constant regardless of the ground speed of the material distributor.

Still another object of this invention is to provide a control device for a material distributor which permits an infinite variety of settings for delivering an infinitely variable amount of material per unit of area traversed by the distributor.

Another object of this invention is to provide a control for an implement carried ram actuated by the ground wheels of the implement for supplying pressured fluid to the ram to control the movement of the ram as a function of ground speed.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a plan view of a material distributing device incorporating the hydraulic ram of this invention and control therefor.

Fig. 2 is an enlarged sectional view taken along the plane 2—2 of Fig. 1.

Fig. 3 is an enlarged longitudinal sectional view of the hydraulic ram and control device of this invention.

Fig. 4 is a sectional view taken along the plane 4—4 of Fig. 3.

Fig. 5 is an enlarged left end elevational view of the control device shown in Fig. 3.

Fig. 6 is a cross sectional view taken along the plane 6—6 of Fig. 3.

Fig. 7 is an enlarged fragmentary detail sectional view of the pump regulator.

As shown on the drawings:

Briefly this invention comprises a hydraulic ram mounted in a cylinder housing and associated therewith is a power driven pump for supplying pressured fluid to the cylinder for moving the ram. A control mechanism is associated with the pump for controlling the amount of pressured fluid delivered to the hydraulic ram as a function of the rotation of a controlling or reference element, and such control device may be readily adjusted to provide an infinite number of settings, whereby the rate of travel of the hydraulic ram may be varied to provide any desired relationship to the rate of movement of the controlling element.

The control device of this invention obviously has wide application, being usable wherever a controlled rate of feed or movement of a certain element of a machine or implement is desired as a function of the rotation of a controlling element; however, for purposes of illustration, such device will be described in connection with its application to a material distributing machine or implement 10 wherein the ground wheels of such implement function as the controlling element. Inasmuch as the particular material distributor 10 forms no part of this invention and is fully described in the above-mentioned copending application, such implement will be here described but briefly.

Such distributor comprises a frame 11 of generally Y-shaped configuration and the forked ends of frame 11 respectively support a pair of upstanding bearing plates 14. A pair of stub axles 12 are horizontally secured to plates 14 and such axles rotatably mount transporting wheels 13. Such plates also support a transverse tubular shaft 15 and such shaft in turn rotatably mounts a substantially quadrant shaped hopper 16. Hopper 16 contains the material to be distributed by material distributor 10. A transversely extending endless belt 17 is mounted in hopper 16 for longitudinal movement. The endless belt 17 is mounted on a pair of longitudinally spaced rollers 18, such rollers being spaced apart by a pair of arms 19, respectively provided at opposite ends of rollers 18 as best shown in Fig. 2. A longitudinal tube member 20 has its ends respectively welded to a medial portion of each of the arms 19 to transversely space such arms at opposite ends of belt 17. The rearwardly disposed roller 18 is rotatably mounted on an axis coincident with the apex of the quadrant shaped hopper 16 as best shown in Fig. 2.

A control device 21 including an hydraulically operated ram is mounted on the left hand forked portion of frame 10 as shown in Figs. 1 and 2 and the pump of such control device, to be later described, is driven by a sprocket 22. Sprocket 22 is connected by a chain 23 to a sprocket 24 mounted on the axle 12 adjacent the left hand wheel 13 as shown in Figs. 1 and 2. Chain 23 likewise surrounds a sprocket 25 secured on the left hand end of the rearmost roller 18, thus sprocket 24 driven by ground wheel 13 moves chain 23 to rotate sprocket 22 and sprocket 25, sprocket 25 in turn effects rotation of the endless belt 17. The endless belt in turn scrapes material from the top of the material contained in hopper 16 and forces such material off the right hand end of hopper 16 as shown in Fig. 2, whereupon such material falls by gravity to strike a deflecting plate 26 provided across the rear end of hopper 16 whereupon the material falls to the ground.

The control device 21 for gradually rotating hopper 16 comprises a cast housing 27 of generally rectangular configuration as best shown in Figs. 3 and 6. Housing 27 has a depending integrally cast cylindrical portion 28 which projects somewhat beyond each end of housing 27 as shown in Fig. 3. The housing 27 has an arcuately shaped right hand end 27a which projects upwardly somewhat above the main portion of the housing 27. The interior of housing 27 and the arcuate end portion 27a of such housing are hollow as shown at 27b and is so formed by coring. The cylindrical portion 28 of housing 27 is provided with an axial bore 28a which slidably receives a piston 29. On the right hand end of cylindrical portion 28 as shown in Fig. 3, there is provided an integral depending boss 28b while on the left hand end there is provided a forwardly extending depending lug 28c. Boss 28b has a vertical, cylindrical threaded recess 28d whereby the rear end of housing 27 is secured to frame 11 by a bolt 30, bolt 30 passes through the flange of frame 11 and threadably engages recesses 28d. A bolt 31 inserted through a suitable vertical aperture in the flange of frame 11 aligned with a vertical hole 28e provided in lug 28c, fastens the forward end of housing 27 to frame 11.

On the left hand side of the arcuate end portion 27a of housing 27 as shown in Fig. 6 there is provided a cylindrical boss 27c while on opposite side of housing end portion 27a there is provided a boss 27d of substantially larger diameter. An axial hole 27e is provided in boss 27c which communicates with the hollow interior of end portion 27a. Boss 27d has an axial hole 27f and the axes of the bores 27f and 27e are coincident. A cylindrical cover 31 fits over the end of boss 27d and such cover is secured to boss 27d by a plurality of bolts 32, a gasket 33 being placed between the adjacent surfaces of cover 31 and lug 27d. Cover 31 has an integral, inwardly projecting bearing boss 31a and such boss has an axial bore 31b, the axis of which is aligned with the axis of bore 27e. The aligned bores 27e and 31b rotatably support a shaft 34. Shaft 34 has an integral, cylindrical portion 34a which is formed eccentrically with respect to the axis of shaft 34. The eccentric cylindrical portion 34a lies within the hollow interior of the arcuately shaped end portion 27a of housing 27 as shown in Figs. 3 and 6. Eccentric 34a is utilized to actuate a pump piston as will be later explained. A sprocket 22 is secured to a projecting end of shaft 34 by a key 22a. Key 22a is locked in place by a radial screw 22b. A pair of oil sealing rings 35 are provided about shaft 34 adjacent the ends thereof within suitable annular rings 34b.

Near the upper edge of housing 27 there is provided a longitudinally disposed, cylindrical bore 27g which communicates with the hollow interior of the arcuate end portion 27a of housing 27. A cylindrical piston-like member 36 is inserted in bore 27g and such piston member slidably cooperates with the wall of bore 27g. The right hand end of piston member 36 contacts the eccentric 34a as best shown in Fig. 3. A fluid pressure regulator indicated generally by the numeral 37 is slidably inserted in bore 27g behind piston member 36.

The fluid regulator 37 comprises a cylindrical housing 37a which has an axial cylindrical recess 37b provided in the right hand end thereof as shown in Fig. 7. Recess 37b has an end recess 37c of smaller diameter and formed coaxially therewith. A third recess 37d is provided at the end of recess 37c and such recess is also co-axial with recess 37c. A ball check valve 38 is suitably seated in the bottom of recess 37c to block off recess 37d. Ball 38 is spring biased into place by a spring 38a which is retained in position by a suitable retainer 38b suitably secured in an angular groove provided in recess 37c.

To admit hydraulic fluid to recess 37d a diametrically disposed hole 37e is provided at the bottom of recess 37d. A wide annular groove 37f is provided about the exterior of housing 37 which communicates with a vertical hole 27f that is provided in housing 27 which in turn communicates with a longitudinal hole 27h provided near the bottom of housing 27 and immediately above the cylindrical portion 28 as shown in Fig. 3. Hole 27h likewise communicates with the hollow interior 27b of housing 27 which serves as an hydraulic fluid reservoir. A vertically disposed hole 27j provided on top of arcuately shaped end 27a of housing 27 permits filling the interior 27b with hydraulic fluid and such hole is sealed by a threaded plug 40.

A threaded shaft 41 projects outwardly from the regulator 37 and such shaft may be either integrally formed therewith or secured in suitable fashion within an axial recess provided in the left hand end of regulator 37. Threaded shaft 41 cooperates with a threaded hole 42a provided in an upstanding bracket 42. Bracket 42 comprises a bar-like member and is vertically secured by a pair of bolts 42b to the left hand end of housing 27 as shown in Fig. 3. A suitable knob or handle 43 is non-rotatably secured to the end of shaft 41 projecting beyond bracket 42 whereby threaded shaft 41 may be rotated. It will then be appreciated that regulator 37 will be likewise rotated but will also be moved longitudinally within bore 27g whereby such regulator may be withdrawn from bore 27g or further inserted therein depending upon the direction of rotation of shaft 41.

In the forward end of the recess 37b of regulator 37, there is inserted a bushing 43 and such bushing has an axial hole 43a which supports the end of a plunger 44. Plunger 44 has a head portion 44a which slidably cooperates with the wall of recess 37b and such head portion also is provided with a conical surface 44d adjacent the stem which cooperates with a conical recess 43b provided on the inside edge of bushing 43 for limiting the travel of such plunger as will be later explained. The right hand end of plunger 44 contacts the end of piston member 36. A spring 45 is placed within recess 37b and the ends of such spring respectively abut the end of recess 37b and the headed end 44a of plunger 44.

A plurality of longitudinally disposed grooves 44b are provided about the periphery of head 44a to permit passage of hydraulic fluid by such head portion and similar grooves 44c are provided on the stem portion for the same purpose. Such spring biases plunger 44 into contact with the end of piston member 36. The purpose of plunger 44 will be later described.

Piston 29 is slidably contained within longitudinal bore 28a and a piston rod 29a is axially secured to piston 29 by a nut 29b screwed on to a threaded end of piston rod 29a which projects through piston 29. An oil sealing ring 29c disposed in an annular groove 29d provided on the peripheral face of such piston effects improved oil sealing. The extreme left end of bore 28a is conically enlarged as shown at 28f to permit pressured fluid to escape from bore 28a as will be later described.

The extreme left end of bore 28a is counterbored as shown at 28g. Such counterbore communicates with longitudinal hole 27h whereby hydraulic fluid from bore 28a may escape or return to the reservoir 27b. Counterbore 28g is sealed by a cap 46 and such cap is secured to the end of the cylindrical portion 28 of housing 27 by a plurality of bolts 46a, a gasket 46b being placed between such cover and the end of cylindrical portion 28. The right hand end of piston rod 29a is axially supported within bore 28a by a bearing plug 47. The right hand end of bore 28a is counterbored as shown at 28h to receive such plug. A split ring 48 cooperates with a suitable annular groove provided in the wall of counterbore 28h to retain plug 47 therein. Bearing plug 47 has an axial hole 47a which slidably supports piston rod 29a. The right hand end of hole 47a is counterbored as shown at 47b, in which is placed a suitable packing 49 to effect an oil seal about the piston rod 29a projecting out of counterbore 47b. A clevis 50 is secured on the end of piston rod 29a which projects out of bearing plug 47 and such clevis is locked on the end of piston rod 29a by a jam nut 50a.

The eccentric 34a provided on shaft 34 is rotated by sprocket 22. Sprocket 22 in turn is driven by the chain 23 which surrounds the ground wheel driven sprocket 24. Accordingly as eccentric 34a is rotated, piston member 36, being contacted by eccentric 34a, is forced inwardly within recess 27g by such eccentric. The spring biased plunger 44 being in contact with the other end of piston member 36 however, forces piston member 36 outwardly again whereupon such piston member is again contacted by such eccentric on its next revolution hence a reciprocating action is imparted to piston member 36. Accordingly when piston 36 moves to the right as shown in Fig. 3, hydraulic fluid from reservoir 27b is drawn from such reservoir through vertical hole 27r to annular groove 37f thence through hole 37e of regulator 37. Such fluid then flows past ball check valve 38, which is opened by the suction stroke of piston 36, thence flows along the longitudinal grooves 44b of head 44a, and 44c provided on the stem of plunger 44 and into the space defined between the end of regulator 37 and piston 36.

On the compression stroke of piston 36, that is when such piston is moved to the left as shown in Fig. 3 by the eccentric 34a, the spring biased ball check valve 38 automatically seals off the fluid from returning to the reservoir so that the hydraulic fluid pressured by the compression movement of the piston 36 is forced out through a transverse hole 51 (Fig. 4) which communicates with bore 27g at a point opposite the extreme end of the compression stroke of piston 36. Transverse hole 51 is counterbored as shown at 51a and a ball check valve 52 is seated in such counterbore. Ball check valve 52 is yieldingly retained in sealing position by a spring 52a and such spring is retained in counterbore 51a by a threaded plug 53 which is screwed into the threaded entering end of counterbore 51a. Hole 51 communicates with a downwardly sloping bore 54 which communicates with the right hand end of bore 28a in the vicinity of the end of bearing plug 47 (not shown). Thus pressured hydraulic fluid enters the bore 28a to act against the face of piston 29.

It will be appreciated that each stroke of piston 36 forces a slug of hydraulic fluid against the face of piston 29 hence such piston is moved incrementally for each compression stroke of piston 36. Thus the output of the pump, that is each stroke of the piston 36, is proportional to each revolution of eccentric 34a and the output is infinitely variable by axial positioning of regulator 37.

If at any time it is desired to bleed the hydraulic fluid contained in bore 28a back to the reservoir to return the element being moved by piston rod 29a, it is merely necessary to open a transverse port 55 provided in housing 27 which communicates with hole 54 and reservoir 27b. Transverse hole 55 is counterbored as shown at 55a and a ball check valve 56 is seated therein which normally blocks off hole 55. A spring 57 yieldingly holds check valve 56 in its seated position. A threaded plug 58 retains spring 57 within counterbore 55a. Ball check valve 56 is removed from its seat by a pin 59 to permit fluid to flow from bore 28a into reservoir 27b. Pin 59 has a reduced diameter end 59a which fits within hole 55. Such end is fluted to permit hydraulic fluid to flow past such reduced diameter end when the ball check valve 56 is unseated as will be presently explained. The other end of pin 59 has a threaded portion 59b which cooperates with a transverse threaded hole 60 provided in the other side of housing 27 in axial alignment with hole 55. An integral boss 27p (Fig. 4) is provided on the exterior of housing 27 co-axial with hole 60 through which such hole passes. Hole 60 in boss 27p, however, is counterbored as shown at 60a to receive an enlarged diameter portion 59c of pin 59. A knob 59d is provided on the end of pin 59 projecting out of boss 60 whereby pin 59 may be rotated to advance or retract the end portion 59a of such pin out of hole 55 whereby ball check valve 56 may be unseated to permit hydraulic fluid to return to reservoir 27b.

The control device 21 is utilized to rotate hopper 16 at a rate proportional to the ground speed of the device so that the material contained in such hopper will be constantly engaged by the endless belt 17 in order to deposit such material on the ground at a constant rate of delivery per unit of area traversed. Accordingly, there is provided on the left hand end of hopper 16 as shown in Figs. 1 and 2, a quadrant shaped cable guide 61. Such guide is secured to the end of hopper 16 as by welding and one end of a cable 62 is secured to the top of hopper 16 as by a hook 16a. Cable 62 is trained around quadrant member 61 and the other end is suitably secured to clevis 50.

*Operation*

To raise hopper 16 at a controlled rate of speed proportional to the ground speed of ground wheel 13, the control device 21 is automatically operated when the fertilizer distributor is towed along over the ground, driving sprocket 24 effecting rotation of sprocket 22 through the chain 23. In the position of hopper 16 as shown in Fig. 2, piston rod 29a extends out of bore 28a so that piston 29 abuts the inside face of bearing plug 47. Rotation of sprocket 22 drives shaft 34 and in turn rotates eccentric 34a which reciprocates piston member 36, the inward stroke serving to compress the hydraulic fluid drawn into recess 37b on the outward stroke of piston 36 as was previously explained. The pressured fluid then escapes through hole 51 and forces open ball check valve 52 so that the pressured fluid flows along hole 54 to enter the extreme right hand end of bore 28a.

As the amount of pressured fluid is incrementally built up in cylinder 28, the piston 29 is incrementally moved to the left and piston rod 29a is then drawn into bore 28a pulling therewith cable 62. Hence as cable 62 is attached at 16a to hopper 16, the hopper will then be incrementally rotated in a clockwise direction. As long as the ground speed of implement 10 is constant, a constant flow of pressured fluid will be forced into bore 28a to act against the face of piston 29 to move piston 29a incrementally inwardly at a substantially uniform rate of speed. Thus a constant rate of delivery of material will be delivered by endless belt 17. However, in the event that the ground speed of the implement 10 increases or decreases, the eccentric 34a will correspondingly increase or decrease in speed to vary the rate of flow of pressured hydraulic fluid into cylinder 28. Obviously there will be a corresponding increase or decrease in the rate of movement of hopper 16 relative to the variable ground speed of the implement. Thus even with variations in the rate of speed of the implement, a constant delivery of material by endless belt 17 will be assured.

To provide for a greater or lesser delivery of material by belt 17, the rate of rotation of hopper 16 may be readily varied by the pressured fluid regulator 37. When regulator 37 is in the position shown in Fig. 3, piston 36 can then reciprocate through its maximum stroke. As the eccentric 34a rotates approximately 180 degrees from that shown in such figure, the plunger 44 is biased to the right by spring 45 whereupon piston 36 will be forced to move to the right an amount equal to the maximum throw of eccentric 34a. Obviously when the eccentric rotates another 180 degrees, the piston 36 will be moved in the opposite direction back to the position shown in Fig. 3. On the compression stroke of such piston, as when the piston moves towards the left as shown in Fig. 3, the column of oil ahead of the piston defined by the space between the left hand end face of piston 36 and bushing 43 is then forced through opening 51 thence into the cylindrical bore 28a. With each suction stroke of piston 36, spring biased plunger 44 forces piston 36 to the right so that such piston will be contacted by some peripheral portion of eccentric 34a. The length of stroke of piston 36 is dependent upon the axial position of regulator 37. At the extreme right hand position of piston 36 the conical portion 44c of plunger 44 will fit within the conical recess 43b thereby limiting further movement of plunger 44.

As regulator 37 is withdrawn from recess 27g, the conical recess 43b of bushing 43 will likewise be moved a corresponding amount, thus the axial position of plunger 44 will also be changed an amount corresponding to the movement of such regulator. Thus the length of stroke of piston 36 on the suction stroke will be reduced an amount equal to the movement of regulator 37. Obviously therefore, any reduction in the length of stroke of piston 36 reduces the amount of oil forced into cylindrical bore 28a thus reducing the amount of travel of piston 29 and hence producing a corresponding reduction in the rate of movement of hopper 16.

It is readily apparent that an infinite number of settings of regulator 37 is readily obtainable by rotation of knob 43, thus the stroke of piston 36 can be adjusted to provide but a minute flow of oil to cylindrical bore 28a whereby the movement of piston 29 is barely perceptible. Hence it is possible by means of this adjusting device to provide a wide range of movement of piston 29 so that infinitely variable rates of material discharge from the hopper 16 may be obtained regardless of the ground speed of the material distributor.

When the hopper is rotated to its upper extreme position, piston 29 then reaches the end of its stroke in bore 28a thereby uncovering the tapered conical portion 28f of bore 28a whereby pressured fluid contained in bore 28a may escape by piston 29 and return to the reservoir 27b through hole 27h, thus the possibility of damage to the control device 21 is substantially eliminated. Hopper 16 may at any time be readily returned to the position shown in Fig. 2 for reloading or other reason by bleeding the pressured fluid contained in bore 28a through aperture 55 by rotating pin 59 to unseat valve 56. Thus the pressured fluid contained in bore 28a is permitted to escape through hole 55 into reservoir 27b as the weight of hopper 16 acted upon by gravity, withdraws piston rod 29a out of the bore 28a thereby moving piston 29 to the extreme right hand end of such bore and into contact with the end of bearing plug 47.

From the above description it is clearly apparent that there is here provided a control device which is particularly useful in controlling the rotation of the hopper of a material distributing device. Such control device can be conveniently set to vary the rate of travel of the hopper whereby a greater or lesser amount of material may be distributed by the material distributor. It is also apparent that this control device permits a constant rate of delivery of material by the material distributor regardless of the ground speed of the distributor as the rate of delivery is a function of the ground speed. Furthermore, the device may be conveniently and accurately set to provide for any rate of delivery of material so that an unskilled operator can utilize this device to the best advantage and without guess-work.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a material distributor having a ground wheel and pivoted hopper, a control device comprising, in combination, a cylinder, a piston in said cylinder, means connecting said piston to the pivoted hopper to pivot the same, a pump housing associated with said cylinder, said housing having a bore, a pump piston in said bore, means driven by said ground wheel for imparting a compression stroke only to said pump piston, a piston regulator in said bore constructed and arranged for axial movement therein, a spring pressed plunger in said regulator, said plunger being in contact with said pump piston for imparting a suction stroke to said pump piston, a fluid reservoir, first fluid passage means for withdrawing fluid from said reservoir into said bore on said suction stroke, second fluid passage means for delivering fluid from said bore to said cylinder on the compression stroke of said pump piston for delivery to said cylinder, and means for varying the axial position of said regulator in said bore to vary the effective stroke of said pump piston by limiting the suction stroke imparted thereto by said plunger, whereby said hopper is incrementally pivoted as a function of the travel of said ground wheel.

2. For use with a material distributor having a pivoted hopper; a control device comprising, in combination, a fluid pressure ram, means connecting the ram to the pivoted hopper to pivot the same, a pump having a reciprocable piston movable through a pressure stroke and a return stroke, means for driving the piston in its pressure stroke only, fluid conduit means connecting the pump and the ram, a piston follower, means urging said follower towards the piston to move said piston in its return stroke, and stop means adjustable longitudinally of said piston to limit movement of the follower and to limit movement of the piston in its return stroke, thereby varying the incremental quantity of fluid supplied by said piston to said ram and controlling the rapidity with which said ram pivots said hopper.

3. For use with a material distributor having a pivoted hopper; a control device comprising, in combination, a fluid pressure ram, means connecting the ram to the pivoted hopper to pivot the same, a pump housing having a fluid reservoir, said housing also defining a bore, a pump piston in said bore, means in said pump housing for imparting only a compression stroke to said pump piston, a pump piston regulator in said bore constructed and arranged for axial movement therein and having means for by-passing fluid therepast to said pump piston, a spring pressed plunger in said regulator, said plunger being in contact with said pump piston and spring pressed thereagainst for imparting a suction stroke to said pump piston, first fluid passage means for withdrawing fluid from said reservoir and past said regulator into said bore on said suction stroke, second fluid passage means for delivering fluid from said bore to said ram on the compression stroke of said pump piston, and means for varying the axial position of said regulator in said bore to vary the effective stroke of said pump piston to thereby vary the incremental quantity of fluid supplied by said pump piston to said ram and control the rapidity with which said ram pivots said hopper.

References Cited in the file of this patent

UNITED STATES PATENTS

| | | |
|---|---|---|
| 617,135 | Weeks | Jan. 3, 1899 |
| 1,996,723 | Henneuse | Apr. 2, 1935 |
| 2,131,749 | Ofeldt | Oct. 4, 1938 |
| 2,286,888 | Arnold | June 16, 1942 |
| 2,407,104 | Schmied | Sept. 3, 1946 |
| 2,430,197 | Wells et al. | Nov. 4, 1947 |